US009858542B2

(12) United States Patent
Calabrese et al.

(10) Patent No.: US 9,858,542 B2
(45) Date of Patent: *Jan. 2, 2018

(54) REAL-TIME PREDICTION AND CORRECTION OF SCHEDULED SERVICE BUNCHING

(71) Applicant: International Business Machines Corporation, Armonk, NY (US)

(72) Inventors: Francesco Calabrese, Dublin (IE); Rahul Nair, Dublin (IE); Fabio Pinelli, Dublin (IE)

(73) Assignee: International Business Machines Corporation, Armonk, NY (US)

(*) Notice: Subject to any disclaimer, the term of this patent is extended or adjusted under 35 U.S.C. 154(b) by 373 days.

This patent is subject to a terminal disclaimer.

(21) Appl. No.: 13/956,153

(22) Filed: Jul. 31, 2013

(65) Prior Publication Data

US 2015/0039363 A1 Feb. 5, 2015

Related U.S. Application Data

(63) Continuation of application No. 13/956,029, filed on Jul. 31, 2013.

(51) Int. Cl.
*G06Q 10/06* (2012.01)
*G06Q 50/30* (2012.01)

(52) U.S. Cl.
CPC . *G06Q 10/06311* (2013.01); *G06Q 10/06312* (2013.01); *G06Q 10/06315* (2013.01); *G06Q 50/30* (2013.01)

(58) Field of Classification Search
CPC ....... G06Q 10/06311; G06Q 10/06312; G06Q 10/06315; G06Q 50/30
See application file for complete search history.

(56) References Cited

U.S. PATENT DOCUMENTS

| 3,734,433 A | | 5/1973 | Metzner | |
| 3,772,691 A | * | 11/1973 | Hansen | ................. G01S 13/753 340/989 |
| 4,220,946 A | | 9/1980 | Henriot | |
| (Continued) | | | | |

FOREIGN PATENT DOCUMENTS

| CN | 102063791 | 5/2011 |
| GB | 2374195 | 10/2002 |

OTHER PUBLICATIONS

Nam Hoai Vu, Bus real-time arrival prediction using statistical pattern recognition technique, Dissertation Abstracts International, v 68, n. 02, p. 403, 2007, CSA Technology Research Database.

(Continued)

*Primary Examiner* — Matthew Gart
*Assistant Examiner* — Stephen S Swartz
(74) *Attorney, Agent, or Firm* — Derek S. Jennings; Patent Mining Works, LLC

(57) ABSTRACT

A method includes: a computer receiving historical data from at least one service vehicle; the computer receiving network definitions for the least one service vehicle; the computer receiving dynamic data from the at least one service vehicle; and the computer developing predictions and corrective actions to prevent service bunching, based upon the historical data, the network definitions, and the dynamic data.

8 Claims, 3 Drawing Sheets

(56) References Cited

U.S. PATENT DOCUMENTS

| | | | |
|---|---|---|---|
| 4,926,343 A | 5/1990 | Tsuruta et al. | |
| 5,305,194 A | 4/1994 | MacDonald | |
| 5,352,857 A * | 10/1994 | Ovaska | B66B 1/18 187/247 |
| 5,541,845 A | 7/1996 | Klein | |
| 5,714,725 A * | 2/1998 | Thangavelu | B66B 1/2458 187/380 |
| 5,739,774 A | 4/1998 | Olandesi | |
| 5,767,462 A | 6/1998 | Thangavelu | |
| 6,240,362 B1 | 5/2001 | Gaspard, II | |
| 6,505,106 B1 | 1/2003 | Lawrence et al. | |
| 6,578,068 B1 * | 6/2003 | Bowman-Amuah | G06F 9/505 709/203 |
| 6,611,755 B1 | 8/2003 | Coffee et al. | |
| 6,697,730 B2 | 2/2004 | Dickerson | |
| 6,898,475 B1 * | 5/2005 | Ruml et al. | 700/103 |
| 7,394,404 B2 | 7/2008 | Kim | |
| 7,487,019 B2 | 2/2009 | Estes et al. | |
| 7,558,740 B2 | 7/2009 | Matheson et al. | |
| 7,715,961 B1 | 5/2010 | Kargupta | |
| 7,783,507 B2 | 8/2010 | Schick | |
| 7,944,346 B2 | 5/2011 | De Castro et al. | |
| 8,126,601 B2 | 2/2012 | Kapp et al. | |
| 8,131,456 B2 | 3/2012 | Mahalingaiah et al. | |
| 8,275,508 B1 | 9/2012 | Adams et al. | |
| 2001/0035314 A1* | 11/2001 | Yoshida | B66B 1/463 187/382 |
| 2002/0046073 A1* | 4/2002 | Indseth et al. | 705/8 |
| 2003/0221915 A1* | 12/2003 | Brand | B66B 1/2458 187/382 |
| 2005/0217946 A1* | 10/2005 | Siikonen | B66B 1/2458 187/277 |
| 2006/0235739 A1* | 10/2006 | Levis et al. | 705/9 |
| 2007/0016496 A1 | 1/2007 | Bar | |
| 2007/0022425 A1* | 1/2007 | Jackson | 718/104 |
| 2009/0216376 A1 | 8/2009 | Atalla | |
| 2011/0296425 A1* | 12/2011 | Fukuda et al. | 718/102 |
| 2011/0308891 A1* | 12/2011 | Friedli | B66B 1/2458 187/247 |
| 2012/0041675 A1 | 2/2012 | Juliver | |
| 2012/0166071 A1* | 6/2012 | Shirahatti | G01C 21/3492 701/118 |
| 2012/0290652 A1* | 11/2012 | Boskovic | 709/204 |
| 2012/0316772 A1* | 12/2012 | Han | G01C 21/3492 701/414 |
| 2012/0326891 A1 | 12/2012 | Cross | |
| 2013/0054289 A1* | 2/2013 | SenGupta | G06Q 10/06 705/7.13 |
| 2015/0046073 A1 | 2/2015 | Saloner | |

OTHER PUBLICATIONS

Mark D. Hickman, An Analytic Stochastic Model for the Transit Vehicle Holding Problem, Department of Civil Engineering and Engineering Mechanics, The University of Arizona, Tucson, Arizona 85721-0072,2001, Transportation Science, vol. 35, No. 3, Focused Issue on Mass Public Transit (Aug. 2001), pp. 215-237.

Xu Jun Eberlein, Nigel H. M. Wilson and David Bernstein , The Holding Problem with Real-Time Information Available, Transportation Science, vol. 35, No. 1, Focused Issue on Its-related Problems(Feb. 2001), pp. 1-18.

Carlos F. Daganzo, A headway-based approach to eliminate bus bunching: Systematic analysis and comparisons, Transportation Research Part B 43 (2009) 913-921.

John J. Bartholdi III A, Donald D. Eisenstein, A self-coördinating bus route to resist bus bunching, Transportation Research Part B 46 (2012) 481-491.

* cited by examiner

REAL-TIME PREDICTION AND CORRECTION OF SCHEDULED SERVICE BUNCHING

CROSS-REFERENCE TO RELATED APPLICATION

This application is a continuation application of U.S. patent application Ser. No. 13/956,029, "REAL-TIME PREDICTION AND CORRECTION OF SCHEDULED SERVICE BUNCHING", filed on Jul. 31, 2013 and is assigned to the same assignee in the present application, contents of which are incorporated by reference herein in its entirety.

BACKGROUND

The present invention relates to real-time prediction and correction, and more specifically, to provide corrective actions for scheduled service vehicles to prevent bunching.

SUMMARY

According to one aspect of the present invention, a method includes: a computer receiving historical data from at least one service vehicle; the computer receiving network definitions for the least one service vehicle; the computer receiving dynamic data from the at least one service vehicle; and the computer developing predictions and corrective actions to prevent service bunching based upon the historical data, the network definitions, and the dynamic data.

According to another aspect of the present invention, a computer system includes: one or more processors, one or more computer-readable memories and one or more computer-readable, tangible storage devices; a historical database operatively coupled to at least one of the one or more storage devices for execution by at least one of the one or more processors via at least one of the one or more memories, configured to receive static data from at least one service vehicle; a network definition database operatively coupled to at least one of the one or more storage devices for execution by at least one of the one or more processors via at least one of the one or more memories, configured to receive network definitions for the least one service vehicle; a communication unit operatively coupled to at least one of the one or more storage devices for execution by at least one of the one or more processors via at least one of the one or more memories, configured to receive dynamic data from the at least one service vehicle; and a prediction unit operatively coupled to at least one of the one or more storage devices for execution by at least one of the one or more processors via at least one of the one or more memories, configured to develop predictions and corrective actions to prevent service bunching based upon the historical data, the network definitions, and the dynamic data.

According to still another aspect of the present invention, a computer program product includes: one or more computer-readable, tangible storage medium; program instructions, stored on at least one of the one or more storage medium, to receive historical data from at least one service vehicle; program instructions, stored on at least one of the one or more storage medium, to receive network definitions for the least one service vehicle; program instructions, stored on at least one of the one or more storage medium, to receive dynamic data from the at least one service vehicle; and program instructions, stored on at least one of the one or more storage medium, to develop predictions and corrective actions to prevent service bunching based upon the historical data, the network definitions, and the dynamic data.

DETAILED DESCRIPTION

Figure 1:
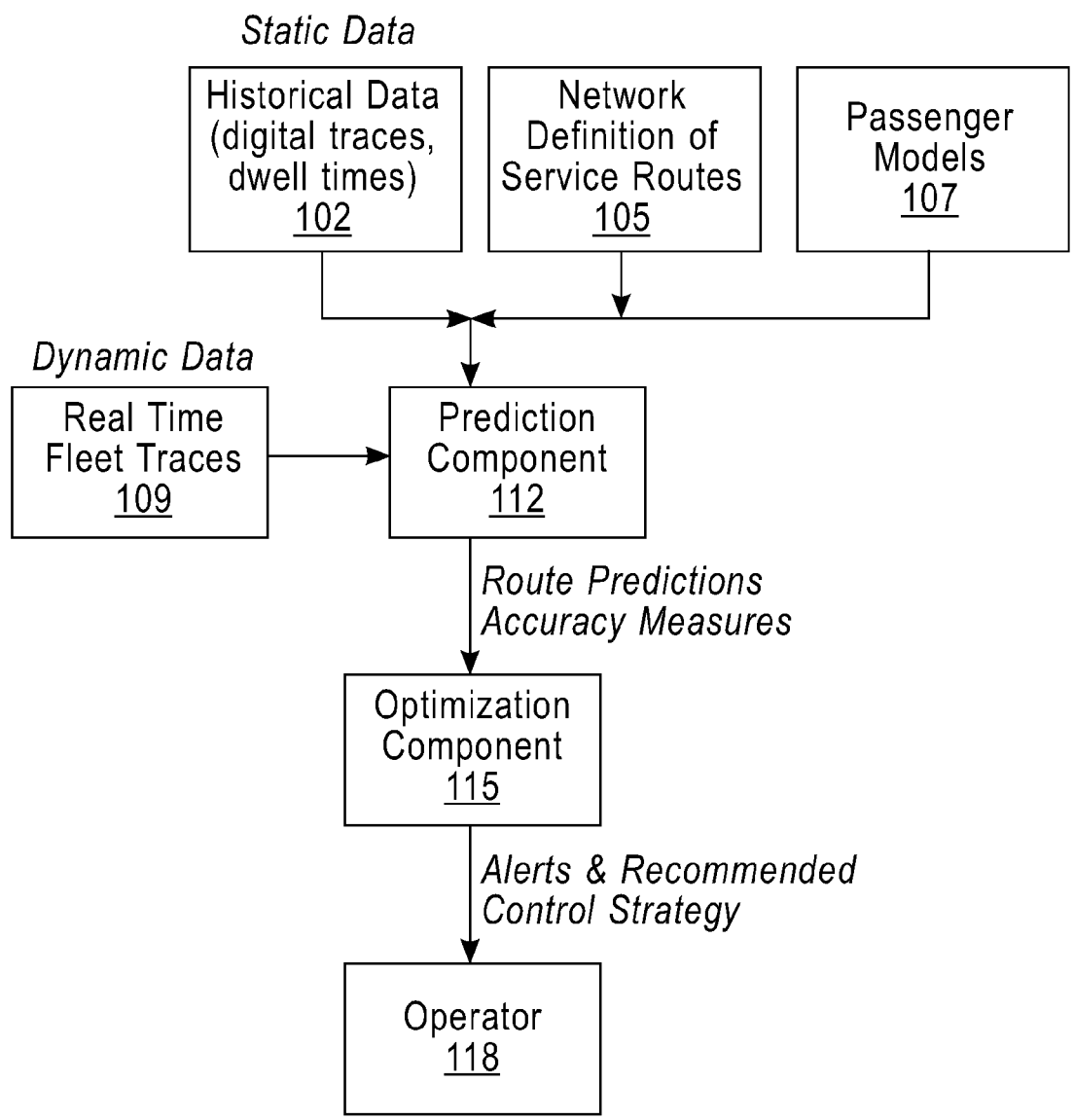
FIG. 1 shows a flowchart according to an embodiment of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. As will be appreciated by one skilled in the art, aspects of the present invention may be embodied as a system, method or computer program product.

Referring to FIG. 1, to prevent service vehicle bunching a process includes gathering static historical data (102) from a service provider. The historical data includes digital traces such as congestion patterns, vehicle performances and breakdowns, sequence of service vehicles positions versus time. The process further uses network definition of service routes (105) set by a service provider. While the routes and service stops may very over years, the routes are fairly consistent. The process further uses passenger models (107) for the service routes. The passenger models specifically address capturing dwell times at the service stops. Another way to capture passenger model data is to use an automatic passenger counting device on the service vehicle itself. Still another way to capture passenger model data is via the use of metro cards at the entry points for the service vehicles. Another process aspect of the invention is to receive dynamic real time fleet traces for the service vehicles (109). The data from the dynamic real time, static data, network definitions and passenger models is supplied to a prediction component unit (112). The output of the prediction unit includes route predictions, computing accuracy measurements, short term forecasting of when bunching is likely to occur, passenger loads, time trajectories for the service vehicles along a route, time trajectories of the service vehicles over different days. Once the various predictions are generated they are supplied to an optimization component (115). The optimization issues alerts and recommends control strategies to the operator of the service vehicle (118) or a network infrastructure. Some of the alerts and recommendations to prevent service bunching of service vehicles may include to slow the vehicle down, skip a stop, speed up, hold position, adjust dispatch at the start terminal or modify the schedule so that a service vehicle does not bunch up with other service vehicles. The alerts can still further include supplying transit information to the passengers or controlling the traffic signaling system.

Figure 2:
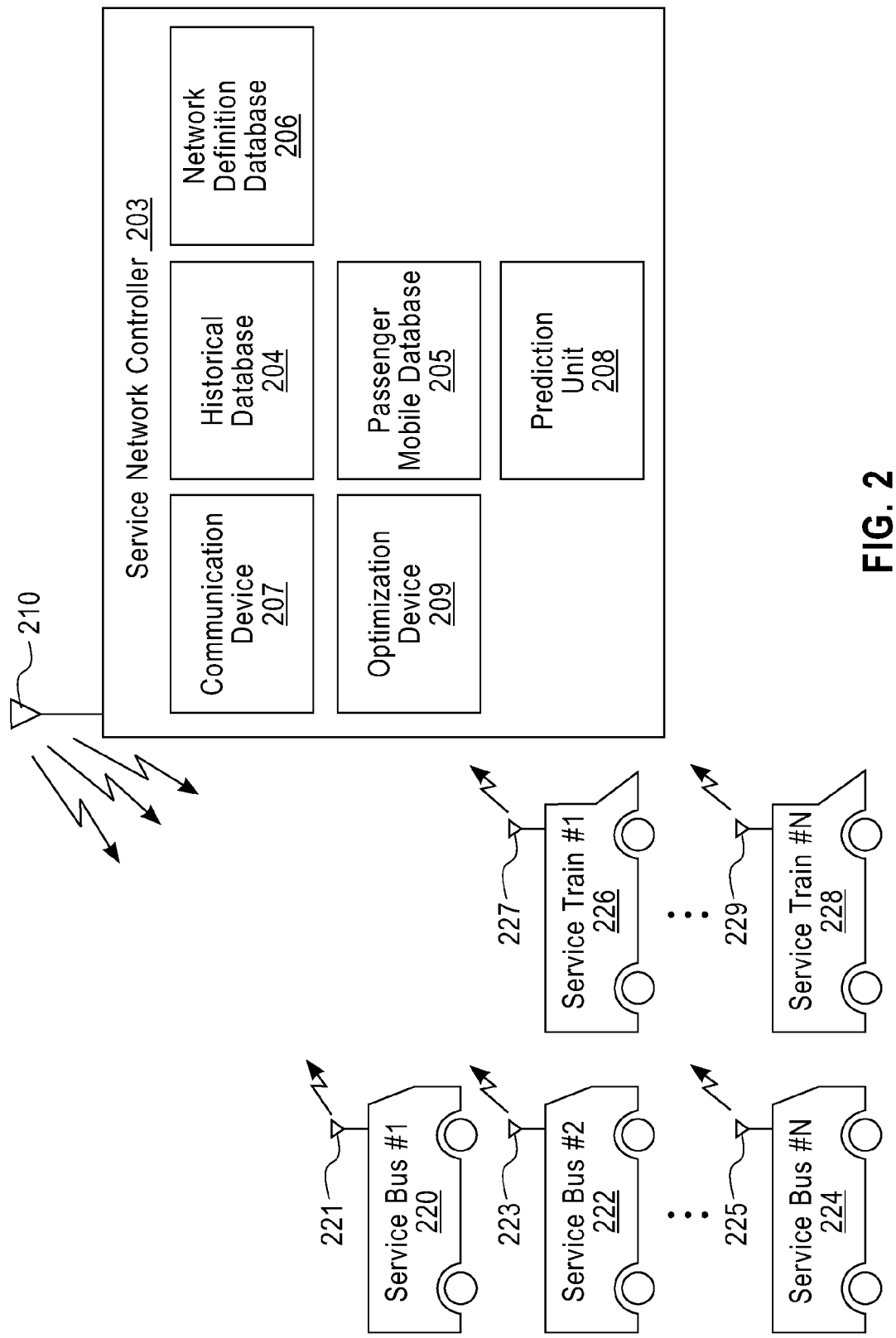
FIG. 2 shows an exemplary implementation according to an embodiment of the present invention.

Referring to FIG. 2, an exemplary implementation according to an embodiment of the present invention shows a service vehicle network. The service network controller 203 uses a historical database 204, a network definition database 206 and a passenger model database 205 and feeds the data these databases to a prediction unit 208. The service network controller 203 further uses the communication device 207, via it's antenna 210, to receive real time data from the service vehicles (220, 222, 224, 226 and 228) via their respective antennas (221, 223, 225, 227, and 229). The real time data is also supplied to the prediction unit 208. The prediction unit 208 then issues service network bunching predictions pertaining to the service vehicles (220, 222, 224, 226 and 228). The predictions are feed to an optimization unit 209. The optimization unit 209 takes the highest predictions and issues service actions to the service vehicles (220, 222, 224, 226 and 228) using the communication device 207. The service vehicles (buses and trains) operate on roads and/or train railways such that some of the alerts and recommendations may include to slow the vehicle down, skip a road bus stop (train rail stop), speed up, hold position, adjust dispatch at the start terminal or modify the bus or train schedule.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
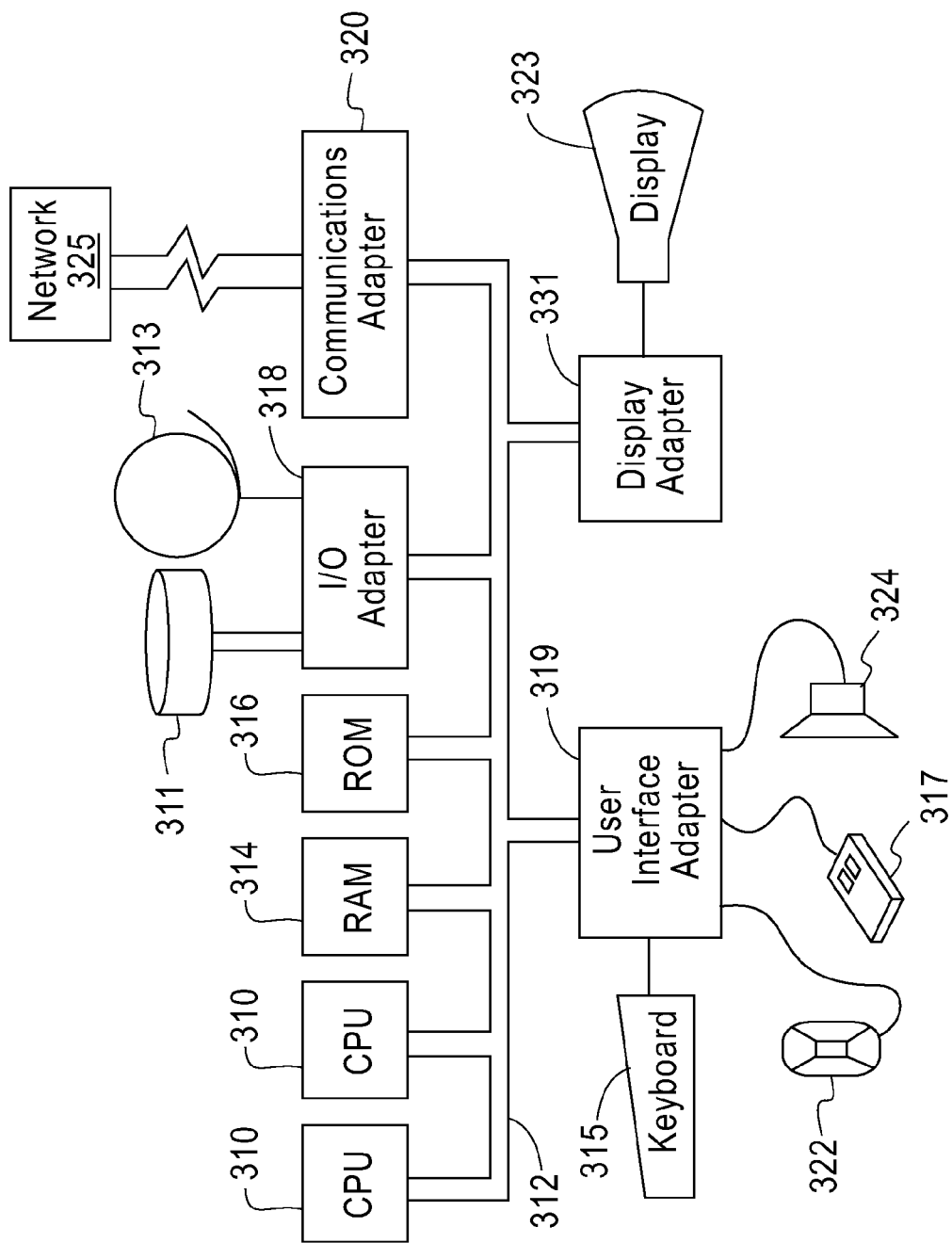
FIG. 3 illustrates a hardware configuration according to an embodiment of the present invention.

Referring now to FIG. 3, this schematic drawing illustrates a hardware configuration of an information handling/computer system in accordance with the embodiments of the invention. The system comprises at least one processor or central processing unit (CPU) 310. The CPUs 310 are interconnected via system bus 312 to various devices such as a random access memory (RAM) 314, read-only memory (ROM) 316, and an input/output (I/O) adapter 318. The I/O adapter 318 can connect to peripheral devices, such as disk units 311 and tape drives 313, or other program storage devices that are readable by the system. The system can read the inventive instructions on the program storage devices and follow these instructions to execute the methodology of the embodiments of the invention. The system further includes a user interface adapter 319 that connects a keyboard 315, mouse 317, speaker 324, microphone 322, and/or other user interface devices such as a touch screen device (not shown) to the bus 312 to gather user input. Additionally, a communication adapter 320 connects the bus 312 to a data processing network 325, and a display adapter 321 connects the bus 312 to a display device 323 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    a service network controller receiving historical data from at least one service bus vehicle from a fleet of service bus vehicles;
    the service network controller receiving network definitions of service routes for the least one service bus vehicle from the fleet of service bus vehicles;
    the service network controller receiving dynamic data from the at least one service bus vehicle from the fleet of service bus vehicles;
    the service network controller receiving passenger model data when the passenger uses a card upon boarding the least one service bus vehicle from the fleet of service bus vehicles; and
    the service network controller developing route predictions and corrective actions to prevent service bunching for the fleet of service bus vehicles, based upon the historical data, the network route definitions, and the dynamic data, wherein the service bus vehicles operate on roads such that one of the corrective actions may include to skip a road bus stop.

2. The method according to claim 1, wherein the predictions are potential future bus service bunching events for the fleet of service bus vehicles along a network of scheduled route services with associated accuracy metrics.

3. The method according to claim 1, wherein another one of the corrective actions optimizing route plans to prevent predicted bus service bunching for the fleet of service bus vehicles along a network of scheduled services.

4. The method according to claim 1, wherein the historical data includes past performance of at least one service bus vehicle from the fleet of service bus vehicles.

5. The method according to claim 1, wherein the dynamic data is real time data from the at least one service bus vehicle from the fleet of service bus vehicles.

6. The method according to claim 3, further comprising the service network controller sending the optimized route plans to the at least one service bus vehicle from the fleet of service bus vehicles.

7. The method according to claim 6, wherein the optimized route plans is a bus vehicle control plan for the at least one service bus vehicle from the fleet of service bus vehicles.

8. The method according to the claim 3, further comprising to the service network controller sending the optimized route plans to a network infrastructure to prevent bunching for the fleet of service bus vehicles.

* * * * *